US012804100B2

(12) United States Patent
Petruzzelli et al.

(10) Patent No.: US 12,804,100 B2
(45) Date of Patent: Nov. 17, 2026

(54) ANTENNA METER APP

(71) Applicant: DISH Technologies L.L.C., Englewood, CO (US)

(72) Inventors: Edmund Petruzzelli, Winchester, VA (US); Marcel Guajardo, Lakewood, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 19/191,766

(22) Filed: Apr. 28, 2025

(65) Prior Publication Data

US 2025/0254263 A1 Aug. 7, 2025

Related U.S. Application Data

(63) Continuation of application No. 18/396,486, filed on Dec. 26, 2023, now Pat. No. 12,302,031, which is a (Continued)

(51) Int. Cl.

*H04N 5/44* (2011.01)
*H04B 1/10* (2006.01)

(Continued)

(52) U.S. Cl.

CPC ........... *H04N 5/445* (2013.01); *H04B 1/1081* (2013.01); *H04B 17/318* (2015.01); *H04H 60/32* (2013.01);

(Continued)

(58) Field of Classification Search

None

See application file for complete search history.

(56) References Cited

U.S. PATENT DOCUMENTS 10,474,450 B1 11/2019 Chim
10,721,511 B2 7/2020 Madriz Ottolina (Continued)

OTHER PUBLICATIONS

Kyosti, Pekka, et al. "On dimensions of OTA setups for massive MIMO base stations radiated testing." Ieee Access 4 (2016): 5971-5981. (Year: 2016).

(Continued)

*Primary Examiner* — Samira Monshi

(74) *Attorney, Agent, or Firm* — Kipman T. Werking; Frontier IP Law PLLC

(57) ABSTRACT

Disclosed is an over-the-air (OTA) antenna meter application ("meter app") that wirelessly connects to an OTA antenna meter ("meter") installed with an OTA antenna and presents information that facilitates a user in installing the OTA antenna at the premises of a customer. For example, the meter app can help the user in pointing and peaking the OTA antenna for one or more broadcast channels, e.g., those selected by the customer. The meter app can store installation information of the OTA antenna for various installations, which can be used in generating a recommendation of, or predicting, installation information for installing the OTA antenna at a specified address. The predicted installation information can include broadcast channels that would be available for reception at the specified address and their signal strength, a specific location of installation on the premises, or whether a pre-amplifier and/or filter is required.

20 Claims, 13 Drawing Sheets

Related U.S. Application Data continuation of application No. 18/078,834, filed on Dec. 9, 2022, now Pat. No. 11,991,471, which is a continuation of application No. 17/518,495, filed on Nov. 3, 2021, now Pat. No. 11,546,544, which is a continuation of application No. 16/601,340, filed on Oct. 14, 2019, now Pat. No. 11,184,573.

(51) Int. Cl.

| | |
|---|---|
| ***H04B 17/318*** | (2015.01) |
| ***H04H 60/32*** | (2008.01) |
| ***H04M 1/72412*** | (2021.01) |
| ***H04N 5/445*** | (2011.01) |
| ***H04N 21/422*** | (2011.01) |
| ***H04W 76/10*** | (2018.01) |

(52) U.S. Cl.

CPC .. *H04M 1/72412* (2021.01); *H04N 21/42204* (2013.01); *H04W 76/10* (2018.02); *H04N 21/42209* (2013.01)

(56) References Cited

U.S. PATENT DOCUMENTS

| | | | | |
|---|---|---|---|---|
| 11,057,132 | B2 | 7/2021 | Petruzzelli | |
| 11,184,573 | B2 | 11/2021 | Petruzzelli | |
| 11,546,544 | B2 | 1/2023 | Petruzzelli | |
| 11,677,481 | B2 | 6/2023 | Petruzzelli et al. | |
| 11,991,471 | B2 | 5/2024 | Petruzzelli | |
| 12,009,878 | B2 | 6/2024 | Petruzzelli | |
| 2005/0047426 | A1 | 3/2005 | Aaltonen | |
| 2011/0023074 | A1* | 1/2011 | Nguyen | H04N 21/6143 725/151 |
| 2011/0096243 | A1* | 4/2011 | Casagrande | H04N 21/4383 348/731 |
| 2012/0026195 | A1 | 2/2012 | Klassen et al. | |
| 2012/0276872 | A1 | 11/2012 | Knauth et al. | |
| 2018/0035164 | A1 | 2/2018 | Sizemore et al. | |
| 2018/0102932 | A1* | 4/2018 | Vanchev | H04B 1/1027 |
| 2021/0112219 | A1 | 4/2021 | Petruzzelli et al. | |
| 2022/0060651 | A1 | 2/2022 | Petruzzelli et al. | |
| 2022/0312222 | A1* | 9/2022 | Jain | H04B 17/191 |
| 2023/0103763 | A1 | 4/2023 | Petruzzelli et al. | |
| 2024/0129429 | A1 | 4/2024 | Petruzzelli | |
| 2024/0333406 | A1 | 10/2024 | Petruzzelli | |
| 2025/0220439 | A1* | 7/2025 | Khanka | H04W 16/04 |

OTHER PUBLICATIONS

Cordeiro, Carlos, et al. "IEEE 802.22: the first worldwide wireless standard based on cognitive radios." First IEEE International Symposium on New Frontiers in Dynamic Spectrum Access Networks, 2005. DySPAN 2005.. Ieee, 2005. (Year: 2005).

Lysko, Albert A. et al. "First Large TV White Spaces Trial in South Africa: A Brief Overview." 2014 6th International Congress on Ultra Modern Telecommunications and Control Systems and Workshops (ICUMI), 2014.

* cited by examiner

ANTENNA METER APP

CROSS REFERENCE TO RELATED APPLICATIONS

This application is a continuation of U.S. patent application Ser. No. 18/396,486, filed Dec. 26, 2023, entitled "ANTENNA METER APP," which is a continuation of U.S. patent application Ser. No. 18/078,834, filed Dec. 9, 2022, entitled "ANTENNA METER APP," which is a continuation of U.S. patent application Ser. No. 17/518,495, filed Nov. 3, 2021, entitled "ANTENNA METER APP," which is a continuation of U.S. patent application Ser. No. 16/601,340, filed Oct. 14, 2019, entitled "ANTENNA METER APP," the entire disclosures of each of which are incorporated herein by reference.

BACKGROUND

Over-the-air (OTA) television is a term used to describe free to air television signals that are broadcast by local television broadcast towers (as opposed to a cable or satellite signal). An OTA antenna is used to receive OTA signals from such broadcast towers. Several factors affect the quality of reception such OTA signals by an OTA antenna installed at a building, including a distance of the broadcast tower from the OTA antenna, the direction of the broadcast tower, the height at which the OTA antenna is installed, the type of OTA antenna installed, whether there is an Long term evolution (LTE) interference, whether a preamplifier is required, etc. It may be necessary to determine the above factors for ensuring a good quality reception. Some currently available OTA meters that help an installation technician in installing an OTA antenna are not intuitive, and are cost-prohibitive.

DETAILED DESCRIPTION

Embodiments are directed to an over-the-air (OTA) antenna meter application ("meter app") that facilitates a user in installing an OTA antenna at the premises of a customer, such as a building. For example, the meter app can help the user in pointing and peaking the OTA antenna for one or more broadcast channels, e.g., those selected by the customer. The pointing and peaking includes determining a position of the OTA antenna, such as a height at which the OTA is to be installed and an orientation of the OTA antenna (e.g., in degrees with respect to magnetic north), for obtaining the broadcast signals at a specified signal quality. In another example, the meter app can store installation information of the OTA antenna for various installations, which can be used in generating a recommendation of, or predicting, installation information for installing the OTA antenna at a specified address. The predicted installation information can include a set of broadcast channels that would be available for reception at the specified address, the signal quality of the set of broadcast channels, a specific location on the premises at which the OTA antenna is to be installed, a type of the OTA antenna, whether a pre-amplifier and/or filter is required, etc.

Not only does the meter app help the user, e.g., an installation technician, in actual installation of the OTA antenna at a customer's premises, the meter app also helps the installation technician in providing enhanced customer service to the customer by setting the customer's expectation with respect to the list of broadcast channels to be received, the quality of those broadcast channels, a list of the equipment that may be required, the installation cost, etc. prior to installing the OTA antenna at the customer's premises.

The meter app can be used with an OTA antenna meter ("meter") that is installed with, or connected to, the OTA antenna. In some embodiments, a meter is a device which measures a signal quality or strength of a signal (e.g., for a broadcast channel) received by the OTA antenna. The meter app can be executed on a client device, such as a smartphone. In some embodiments, the meter and the meter app communicate wirelessly, e.g., via Bluetooth. The OTA meter provides various signal data such as radio frequencies of the broadcast channels and their signal strength to the meter app.

Figure 1:
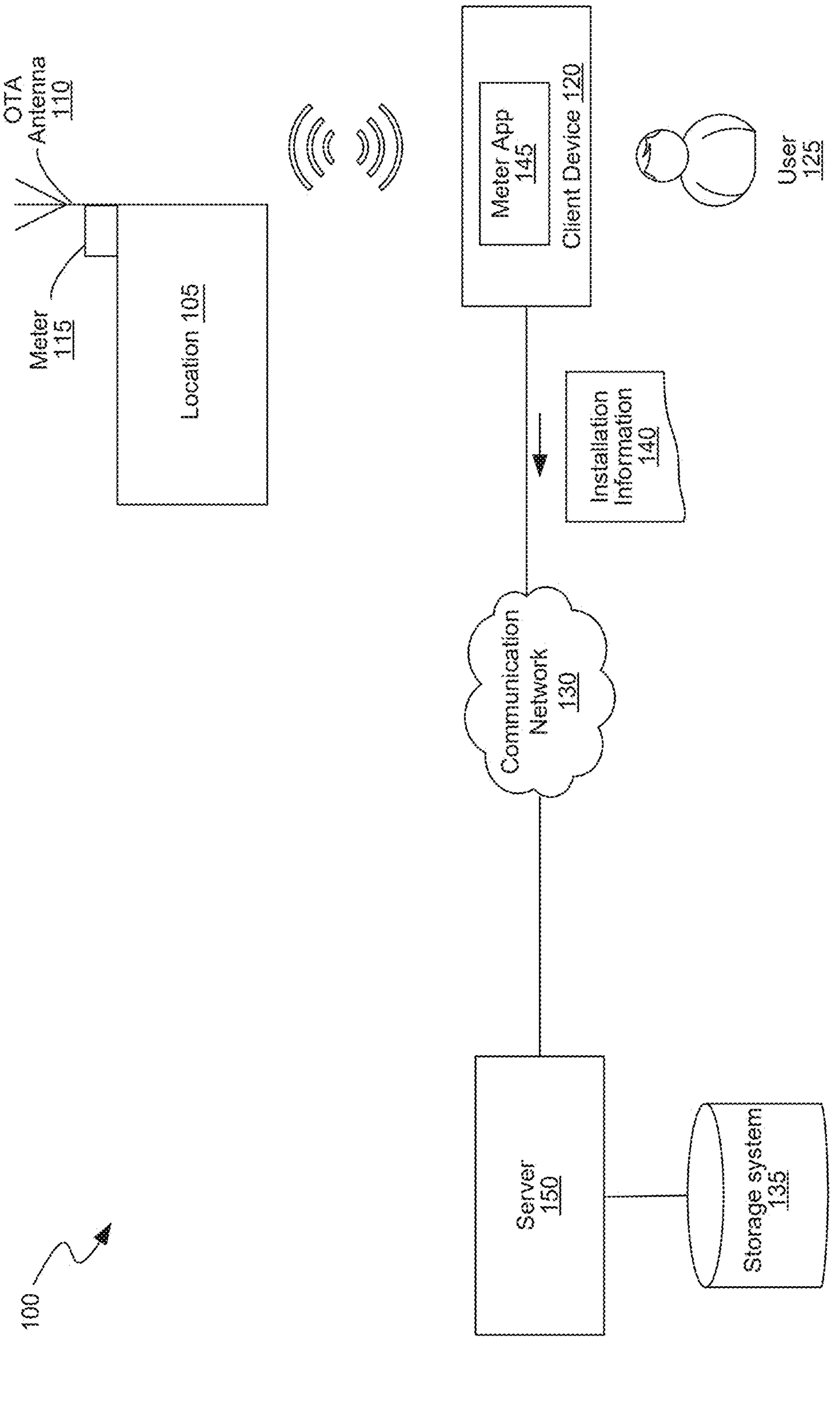
FIG. 1 is a block diagram of an environment in which the disclosed embodiments can be implemented.

Turning now to FIG. 1, FIG. 1 is a block diagram of an environment 100 in which the disclosed embodiments can be implemented. The environment 100 includes a client device 120 in which a meter app 145 is installed. The meter app 145 is a mobile app that can be downloaded to the client device 120, e.g., from an app store hosted on a server device (not illustrated), and installed on the client device 120. However, in some embodiments, the meter app 145 can also be implemented as a website, which can be accessed using an application on the client device 120, such as a web browser. The client device 120 can be any of a variety of computing devices, e.g., a desktop computer, a laptop computer, a smartphone, a tablet PC, a wearable device, that is capable of communicating with an OTA meter 115. In some embodiments, the OTA meter 115 has a wireless communication interface, such as Bluetooth. Accordingly, the client device 120 and the OTA meter 115 may communicate wirelessly using Bluetooth. However, the wireless communication between the client device 120 and the OTA meter 115 is not restricted to Bluetooth, it can happen over other wireless communication protocols. In some embodiments, the OTA meter 115 can also include a wired communication interface, which enables communication with the client device 120 over a wired means.

Figure 4B:
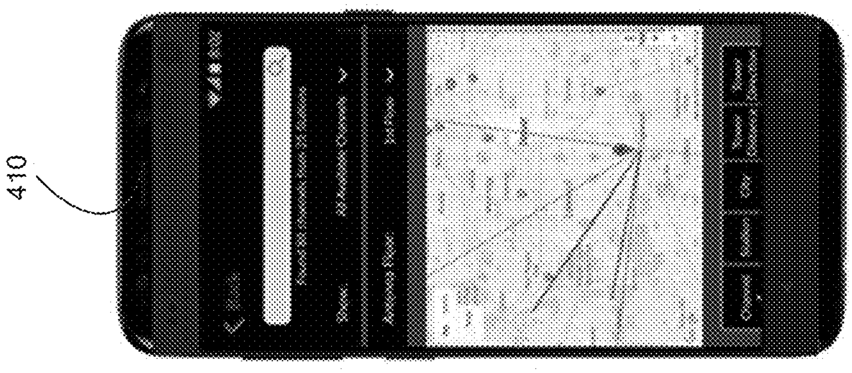
FIG. 4B is a screenshot of a mapping tool of the meter app, consistent with various embodiments.
Figure 4A:
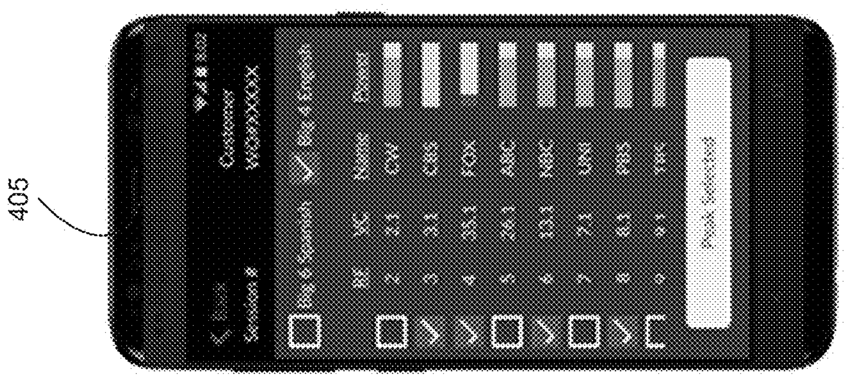
FIG. 4A is a screenshot of a channel scan feature graphical user interface (GUI) of a meter app, consistent with various embodiments.
Figure 4C:
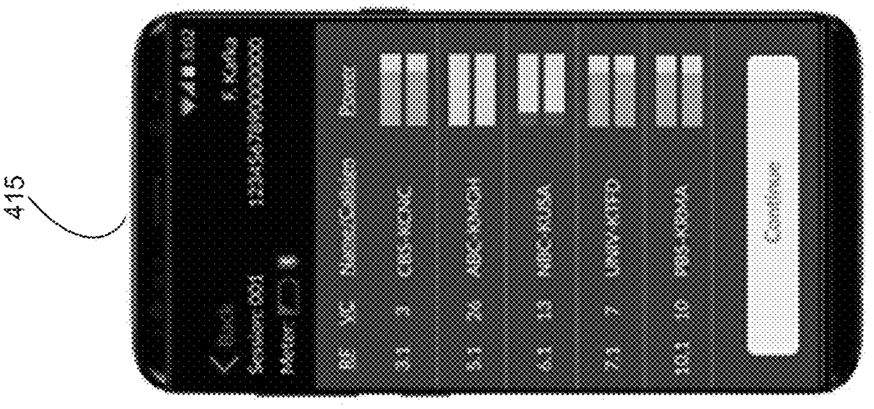
FIG. 4C is a screenshot of a channel peaking GUI of the meter app, consistent with various embodiments.
Figure 4D:
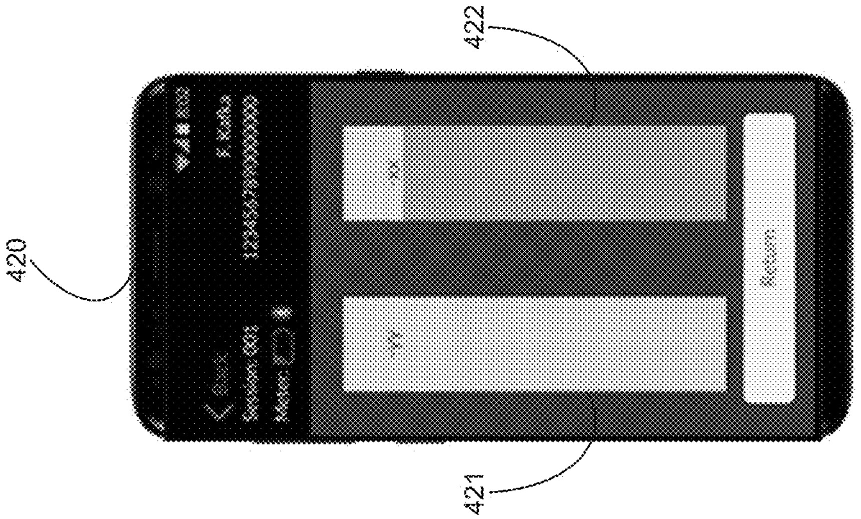
FIG. 4D is a screenshot of a signal strength GUI of the meter app, consistent with various embodiments.

In the environment 100, the meter 115 is installed with the OTA antenna 110, which is to be installed at a location, such as building 105. The meter app 145 provides various information that helps a user 125, e.g., installation technician, in installing the OTA antenna 110 at the building 105. Upon connecting the client device 120 to the meter 115, e.g., wirelessly, the meter app 145 receives signal data from the meter 115 and interprets the signal data to show a list of the broadcast channels available for reception by the OTA antenna 110 and their signal strength (also referred to as "signal quality") in the meter app 145. In some embodiments, the signal data includes a radio frequency of the signal received for a broadcast channel and the signal strength. The signal strength of a broadcast channel can be measured as a function of one or more signal metrics, including for example, a power, signal-to-noise (SNR) ratio, or a modulation error ratio (MER) of a radio signal of the corresponding broadcast channel. The meter app 145 can display the signal strength in various forms, e.g., as numbers, or other graphical representations such as rectangular bars of varied color based on the signal strength (e.g., as illustrated in FIGS. 4A, 4C and 4D). In some embodiments, a weak signal, e.g., a signal whose strength is less than a specified threshold, may indicate that the OTA antenna 110 is not positioned appropriately. The user 125 may try adjusting the position of the OTA antenna 110, e.g., change the height and/or a direction of the OTA antenna 110, and determine if the signal strength improves by looking at the signal strength displayed in the meter app 145, e.g., as the OTA antenna 110 is adjusted.

In some embodiments, the signal strength of a broadcast channel improves when the OTA antenna 110 is oriented in the direction of the broadcast tower of the broadcast channel. The meter app 145 includes a mapping tool (e.g., as illustrated in FIG. 4B) that displays on a geographical map, the location of the building 105 (e.g., based on address of the building) and the location of the broadcast towers of various broadcast channels. Additionally, the mapping tool may also display connecting lines between the broadcast towers and the address of the building 105 and their directions, e.g., in terms of degrees from the address of the building such as 65 degrees NE). The user 125 may refer to the mapping tool to peak the OTA antenna 110 for the broadcast channels. In some embodiments, antenna peaking refers to orienting a directional antenna toward the greatest radio signal amplitude (e.g., greatest signal strength). The signal strength displayed in the meter app 145, which is received from the meter 115, may have changed in response to adjusting the position of the OTA antenna 110, and if the revised signal strength has improved and/or exceeded the specified threshold (also referred to as "strong" signal), then it indicates the broadcast channel reception is of an expected/desired quality.

The meter app 145 allows the user 125 to select a set of broadcast channels, e.g., those that a customer is interested in watching, view the signal strength of the selected set of broadcast channels, view the location of the broadcast towers of the selected set of broadcast channels in the mapping tool and to peak the OTA antenna for the selected set of broadcast channels accordingly. The mapping tool also allows the user 125 to determine which type an OTA antenna 110 may be required to receive the selected set of broadcast channels. For example, some broadcast towers can be located within a 60-mile range from the address of the building 105 and some within a 35-mile range. Accordingly, the mapping tool can help the user 125 decide whether 60-mile range OTA antenna is necessary, or a 35-mile range OTA antenna would be sufficient to receive the selected set of broadcast channels at a specified signal strength. In another example, the meter app 145 can also help the user 125 in determining whether an indoor OTA antenna or an outdoor OTA antenna is suitable for the building 105. In cases where the building 105 is so far from broadcast towers that it is out of the reception range of an indoor OAT antenna, or in cases where there is interference within the building 105, the meter app 145 can indicate that the broadcast signal is weak, based on which the user 125 can try installing an outdoor OTA antenna and check the signal reception. If the signal is strong with the outdoor OTA antenna, then an outdoor OTA antenna is more suitable than the indoor OTA antenna.

In some embodiments, the meter app 145 also helps the user 125 in determining whether an additional equipment such as a filter and/or pre-amplifier may have to be installed with the OTA antenna 110. For example, there may be interference from Long Term Evolution (LTE) signals near the building 105 due to which the broadcast channel signal may still be weak (regardless of whether the OTA antenna 110 is peaked), or there may even be a channel loss. The user 125 can install an LTE filter, which filters the LTE signals from the broadcast channel signal, may improve the signal strength of the broadcast channels. In another example, the signal strength of the broadcast channels may still be weak regardless of whether the OTA antenna 110 is peaked and may improve upon installing a pre-amplifier with the OTA antenna 110. In some embodiments, the LTE filter may be integrated into the pre-amplifier.

As can be appreciated, the meter app 145 helps the user 125 in determining one or more installation parameters for installing the OTA antenna 110 at the building 105. The user 125 can record the installation parameters as part of installation information 140 in the meter app 145. An installation parameter can include one or more of a type (e.g., indoor vs. outdoor) of the OTA antenna 110, an installation height of the OTA antenna 110, a direction (e.g., in degrees with respect to magnetic north) of the OTA antenna 110, a type of OTA adapter (e.g., Hauppage model vs. Lark/Dish Model), a picture of the installation of the OTA antenna 110, any additional equipment (e.g., pre-amplifier, LTE filter) installed with the OTA antenna 110, or a set of broadcast channels received by the OTA antenna 110 and their signal strengths. The meter app 145 can store the installation information 140 in association with a workorder for a customer, which includes one or more of a workorder identification (ID), name of the customer, contact information of the customer (e.g., telephone number and/or email ID), address of the building 105, requested broadcast channels, etc.

The meter app 145 can transmit the installation information 140 to a server device ("server") 150, which can store the installation information 140 in a storage system 135. In some embodiments, if the client device 120 is "offline," that is, does not have access to a communication network 130, such as Internet or local area network (LAN), to connect with the server 150, the installation information 140 is stored locally in the client device 120, and is transmitted to the server 150 when the client device 120 goes "online," that is, can access the communication network 130 to connect with the server 150. After transmitting the installation information 140 to the server 150, the installation information 140 may be deleted from the client device 120. However, in some embodiments, the installation information 140 may be continued to be stored at the client device 120 event after it is transmitted to the server 150.

Figure 2B:
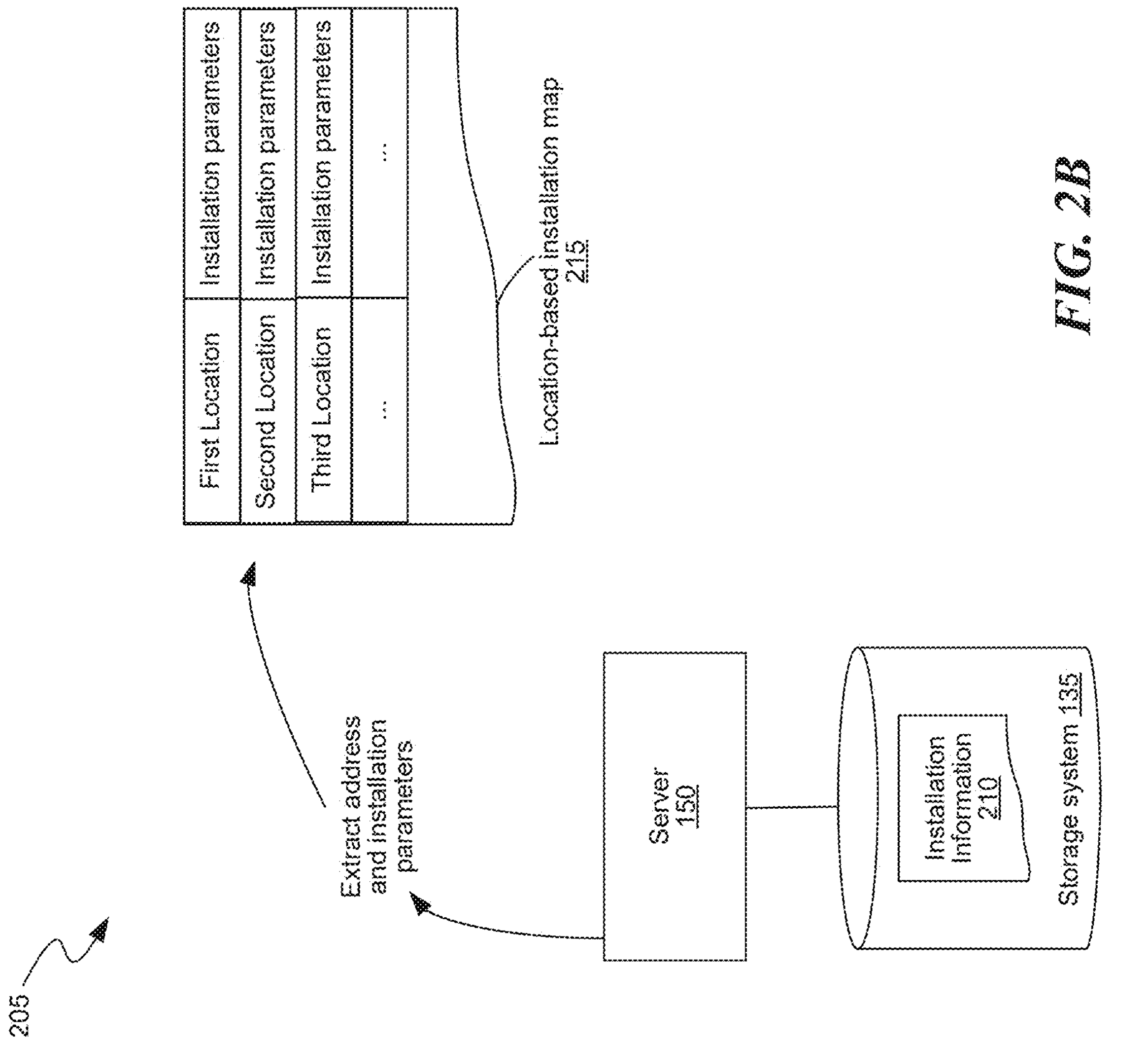
FIG. 2B is a block diagram for generating a location-based installation map, consistent with various embodiments.
Figure 2A:
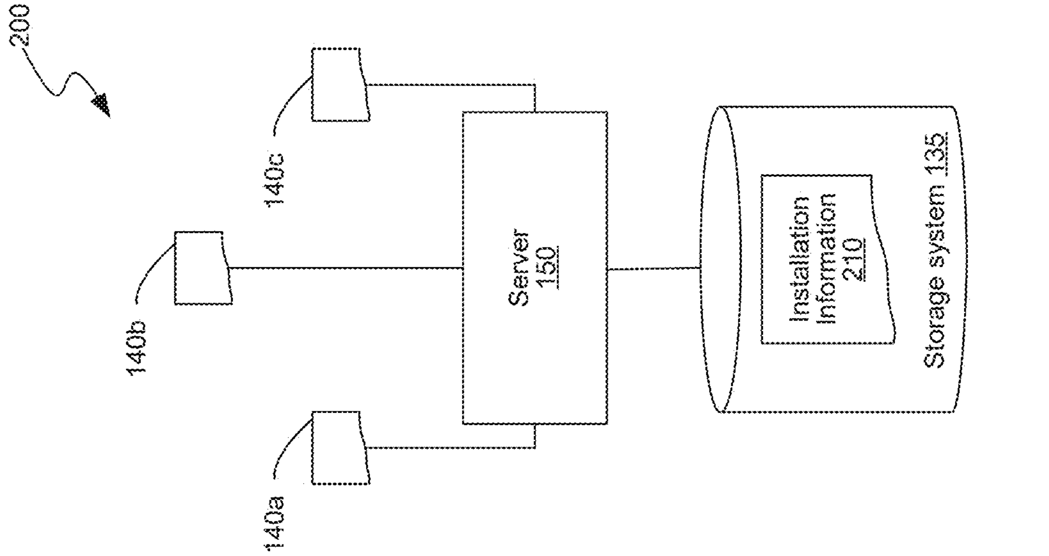
FIG. 2A is a block diagram illustrating a server of FIG. 1 storing installation information associated with multiple installations of an OTA antenna, consistent with various embodiments.
Figure 3:
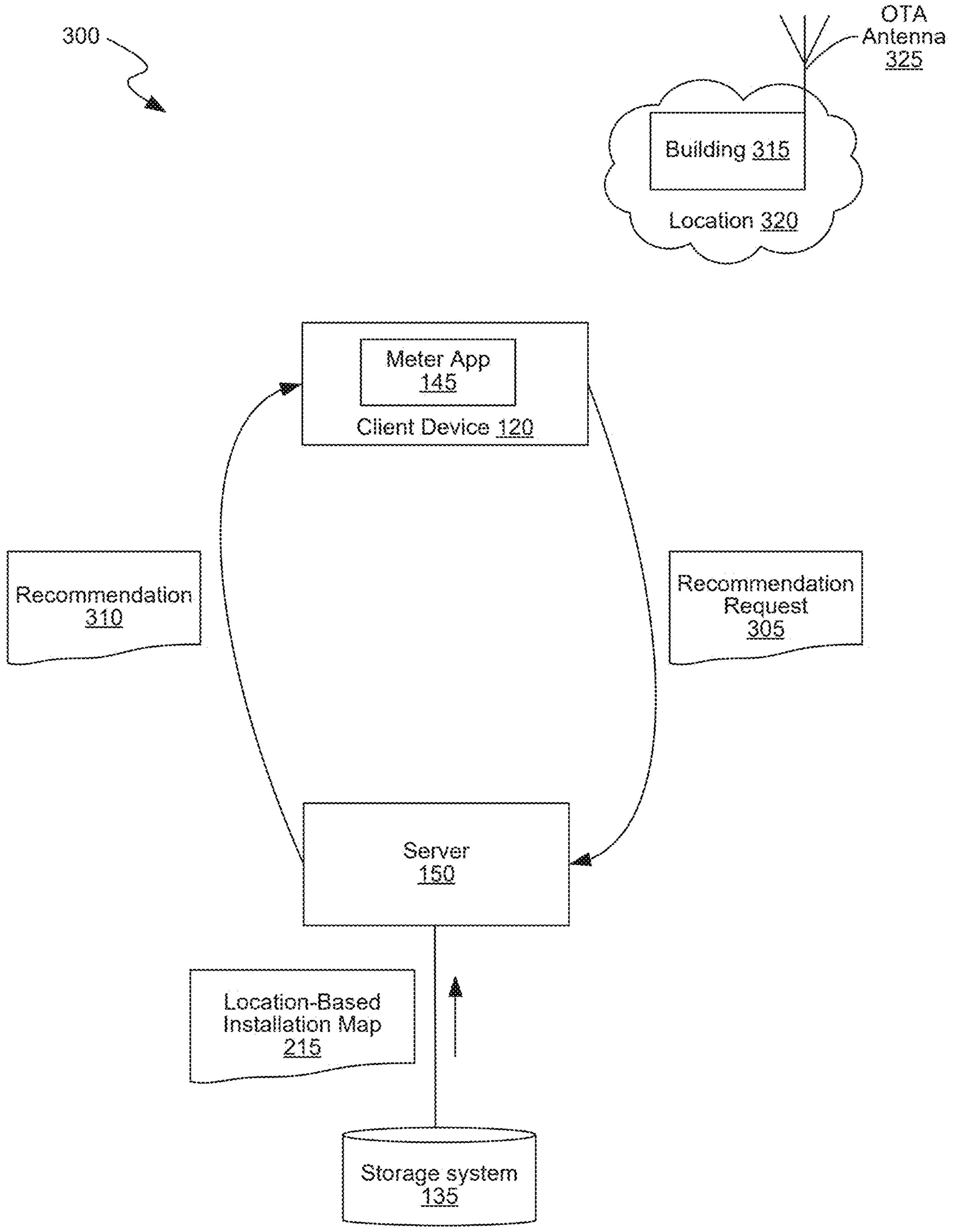
FIG. 3 is a block diagram for generating a recommendation of installation information, consistent with various embodiments.

In some embodiments, the installation information, such as the installation information 140, submitted by one or more users can be used in predicting or generating installation information for new installations of the OTA antennas, as described at least with reference to FIGS. 2A, 2B and 3.

FIG. 2A is a block diagram illustrating the server of FIG. 1 storing installation information associated with multiple installations of the OTA antenna, consistent with various embodiments. After installing an OTA antenna at the building, users can submit the installation information to the server 150. The example 200 illustrates the server 150 receiving installation information 140*a,* 140*b* and 140*c* associated with three different installations of an OTA antenna such as the OTA antenna 110. The three installations can be performed by the same user or different users at different buildings. The installation information 140*a*-140*c* can be transmitted to the server 150 at different times or at the same time. In one example, the installation information 140*a* is transmitted from a client device, such as the client device 120, as soon as the user inputs the installation information into the client device and submits the installation information 140*a* for transmission to the server 150. In another example, the client device can transmit the installation information 140*a* to the server 150 when the client device goes online. In another example, the transmission of installation information to the server 150 can be scheduled. Further, the installation information 140*a*-140*c* can be transmitted to the server 150 from the same client device, such as the client device 120, or different client devices. The server 150 stores the installation information 140*a-c* of different installations collectively as installation information 210 in the storage system 135.

FIG. 2B is a block diagram for generating a location-based installation map, consistent with various embodiments. The example 205 illustrates the server 150 generating a location-based installation map 215, which stores a mapping of an address of installation of the OTA antenna and one or more installation parameters of the installation. In some embodiments, the location-based installation map 215 is used for generating recommendations of, or predicting, installation information for installing an OTA antenna, such as the OTA antenna 110, at a new address (e.g., an address of a building whose installation information is not stored in the storage system 135).

The server 150 accesses the storage system 135 to retrieve the installation information 210. The installation information 210 can have multiple installation records each of which corresponds to installation information associated with a particular installation. For each installation record, the server 150 extracts (a) an address of the building at which the installation is performed and (b) one or more installation parameters associated with the installation, and stores a mapping of the address and the one or more installation parameters in the location-based installation map 215.

The user 125 can query the server 150 for installation information by providing an address, or at least a portion thereof, of a building as query input. When the server 150 receives a request from the client device 120 for installation information at a particular address, the server 150 performs a look-up in the location-based installation map 215 using the address and retrieves the one or more installation parameters for the matching address. The server 150 can then transmit the retrieved installation information, e.g., the one or more installation parameters, to the client device 120.

In some embodiments, the user 125 can specify only a portion of the address in the query input. For example, the user 125 can provide only a street name, an intersection of two streets, a zip code, or even mark a portion on a geographical map in the meter app 145, as the location input for query. If there are multiple entries in the location-based installation map 215 that match the location input in the query, the server 150 returns multiple sets of installation parameters corresponding to installations within a specified proximity of the query input location. For example, if the user 125 provided a street name, then the server 150 identifies all addresses in the location-based installation map 215 that are on the street, or in a one-mile stretch on the street, and retrieves the installation information for each of those installations.

FIG. 3 is a block diagram for generating a recommendation of installation information, consistent with various embodiments. In the example 300, the server 150 can generate a location-specific installation recommendation 310 for installing an OTA antenna 325 (e.g., similar to the OTA antenna 110), at a building 315 located in a specific location 320. The location-specific installation recommendation 310 can include one or more installation parameters, such as a type of the OTA antenna 325, an installation height of the OTA antenna 325, a direction of the OTA antenna 325, an exact location of the installation of the OTA antenna 325 in the building 315, a type of the OTA adapter, a picture of the installation of the OTA antenna 325, any additional equipment to be installed with the OTA antenna 325, or a set of broadcast channels received by the OTA antenna 325 and their signal strengths.

The user 125 can use the meter app 145 to send a recommendation request 305 to the server 150 for generating installation recommendation 310 for the specific location 320. The user 125 can input the specific location 320 in the form of an address of the building 315, which can be a complete address (e.g., having at least a building number, street name, and zip code) or a portion thereof (e.g., street name, city and state, or zip code). The server 150 performs a look-up in the location-based installation map 215 to identify all entries that have addresses that are within a specified proximity, e.g., one mile or a couple of blocks, of the specific location 320, and retrieves the installation information for each of those addresses. The server 150 analyzes the retrieved installation information and generates the installation recommendation 310 based on the analysis. The server 150 can use any number of methods to perform the analysis, including artificial intelligence (AI), machine learning (ML), rule-based analysis, or statistical analysis.

By analyzing the retrieved installations (e.g., the installation information of the retrieved addresses), the server 150 can determine that the OTA antenna installed at the buildings in those addresses receive a first set of broadcast channels. Accordingly, the server 150 generates the installation recommendation 310 indicating that the OTA antenna 325 installed at the building 315 may receive the first set of broadcast channels. In some embodiments, the server 150 can also include a likelihood of the availability of the first set of broadcast channels in the installation recommendation 310. For example, the more the number of buildings in the analyzed data set receive a broadcast channel, the higher the likelihood of availability of that broadcast channel for reception at the building 315.

Similarly, the server 150 can determine from the analyzed installations that the buildings in the analyzed installations receive a specified broadcast channel at a specified signal strength. Accordingly, the server 150 can indicate in the installation recommendation 310 that the building 315 would likely receive the specified broadcast channel at the specified signal strength. In some embodiments, the server 150 can indicate the predicted signal strength as a range of values, based on the various signal strengths of the specified broadcast channel in the analyzed installations.

In another example, the server 150 can determine from the analyzed installations that a specified broadcast channel is not available for reception at one or more of the buildings in the analyzed installations. Accordingly, the server 150 can indicate in the installation recommendation 310 that the specified broadcast channel would likely be not available for reception at the building 315. In some embodiments, the server 150 can also include a likelihood of the availability or unavailability of the specified broadcast channel in the installation recommendation 310, e.g., as described above.

In another example, the server 150 can determine from the analyzed installations that a specified broadcast channel is available for reception at one or more of the buildings in the analyzed installations if a pre-amplifier is installed with the OTA antenna. Accordingly, the server 150 can indicate in the installation recommendation 310 that the specified broadcast channel would likely be available for reception at the building 315 at a specified signal strength if a pre-amplifier is installed with the OTA antenna 325.

In another example, the server 150 can determine from the analyzed installations that a location of the one or more of the buildings in the analyzed installations is prone to LTE interference. Accordingly, the server 150 can indicate in the installation recommendation 310 that a specified broadcast channel would likely be available for reception at the building 315 at a specified signal strength if an LTE filter is installed with the OTA antenna 325.

In another example, the server 150 can determine from the analyzed installations that a location of the one or more of the buildings in the analyzed installations is prone to multipath inflection or interference. In some embodiments, multipath Interference is caused by the signal being bounced around some surfaces such as wet or icy surfaces, buildings or a passing airplane, hilly terrains or trees. The analysis may also indicate that the multipath inflection can be prevented by (a) avoiding a set of locations in the building for the installation and/or (b) installing the OTA antenna in a particular location of the building. In some cases, moving the OTA antenna 110, e.g., a few feet, can help alleviate the problem. If the problem persists, the OTA antenna 110 may have to be elevated, installed on the roof or mounted to a pole. Accordingly, the server 150 can indicate in the installation recommendation 310 that a specified broadcast channel would likely be available for reception at the building 315 at a specified signal strength if the OTA antenna 325 is installed at a specified location in the building 315.

In another example, the server 150 can determine from the analyzed installations that (a) to receive a specified broadcast channel at one or more of the buildings in the analyzed installations, (b) for certain types of buildings, or (c) buildings in a specified location, a specified type of the OTA antenna is necessary. Accordingly, the server 150 can indicate in the installation recommendation 310 that a specified type of the OTA antenna 325 may be necessary for receiving a specified broadcast channel at the building 315.

In another example, the server 150 can determine from the analyzed installations that an OTA antenna is to be installed at a specified location of the building, in a specified orientation and at a specified height to receive a broadcast channel with a specified signal quality. Accordingly, the server 150 can indicate in the installation recommendation 310 that the OTA antenna 325 is to be installed at a specified location of the building 315, in a specified orientation and at a specified height to receive the broadcast channel with the specified signal quality at the building 315.

The above are just a few examples of the installation parameters predicted or recommended by the server 150. However, the server 150 is not restricted to the above installation parameters and can predict or generate recommendation for more, less or different set of installation parameters. The installation recommendation 310 can aid the installation technician not only in installing the OTA antenna 325 at the building 315 but also in setting the customer's expectation (e.g., with respect to the installation cost, expected broadcast channels and their quality).

FIGS. 4A-4E are screenshots of various graphical user interfaces (GUIs) of the meter app of FIG. 1, consistent with various embodiments.

FIG. 4A is a screenshot of a channel scan feature GUI of the meter app 145, consistent with various embodiments. The channel scan feature GUI 405 allows a user, such as the user 125, to scan for one or more broadcast channels available for reception by an OTA antenna installed at a building, such as the OTA antenna 110 at building 105. The client device 120 receives signal data from the meter 115 and displays it in the channel scan feature GUI 405. The signal data displayed in the channel scan feature GUI 405 can include one or more of a radio frequency in which a broadcast channel is transmitted, a virtual channel number of the broadcast channel, a station name of the broadcast channel, a call sign of the station, or a signal strength of the broadcast channel. The signal strength is measured as a function of one or more of a power, SNR ratio, or MER of a radio signal of the broadcast channel. Further, the signal strength can be displayed in various formats, e.g., as numbers, or other graphical representations such as rectangular bars of varied color based on the signal strength. In the channel scan feature GUI 405, the signal strength is displayed as power and SNR values. Each of those two is displayed in the form of a rectangular bar, which can be one of three colors indicating a specific signal strength. For example, red color indicates a weak signal, yellow color indicates a good signal, and green color indicates a strong signal. The user 125 can select one or more of the broadcast channels from the channel scan feature GUI 405 to view further details. In some embodiments, the channels be pre-selected by the meter app 145, e.g., based on user selection information recorded in a workorder associated with the installation.

In some embodiments, an OTA antenna installation may be associated with a workorder, which is created by the server 150, or even the client device 120, in response to receiving an installation request from a customer, e.g., a resident of the building 105. The workorder can include a workorder identification (ID), customer details, and details of the user 125. The customer details can include one or more of a customer name, address of the installation (e.g., address of the building 105), customer contact information, requested broadcast channels, or requested installation date and time. The user details can include one or more of an installation technician ID or name, a picture of the technician or contact details. The meter app 145 can display at least some of the workorder details, e.g., a workorder ID and customer name as illustrated in FIG. 4A.

FIG. 4B is a screenshot of a mapping tool of the meter app 145, consistent with various embodiments. The mapping tool 410 displays a location of a broadcast tower of the broadcast channel selected in the channel scan feature GUI 405 in a geographical map. The mapping tool 410 also displays a location of the building 105 in the geographical map (e.g., based on the address of the building 105). In some embodiments, the mapping tool 410 also displays connecting lines between the location of the broadcast tower and the location of the building 105 to depict a direction of the broadcast tower from the building 105, which can aid the user 125 in orienting the OTA antenna 110 towards the broadcast tower.

FIG. 4C is a screenshot of a channel peaking GUI 415 of the meter app 145, consistent with various embodiments. The channel peaking GUI 415 displays signal data of the broadcast channels selected in the channel scan feature GUI 405. The user 125 may further select a broadcast channel from the channel peaking GUI 415 to view the signal data, such as the signal strength, of the selected broadcast channel, e.g., as displayed in the signal strength GUI 420 of FIG. 4D. The user 125 may navigate to the channel peaking GUI 415 to view only the user selected broadcast channels, which can be the broadcast channels that a customer is interested in receiving, and focus on peaking the OTA antenna 110 for the selected broadcast channels.

FIG. 4D is a screenshot of a signal strength GUI 420 of the meter app 145, consistent with various embodiments. The signal strength GUI 420 shows two different parameters that are indicative of the signal strength of the broadcast channel the user selects from the channel peaking GUI 415. The signal strength GUI 420 shows a first bar 421 that is indicative of power of the signal and a second bar 422 that is indicative of the SNR of the signal of the corresponding broadcast channel. In some embodiments, the user 125 can select one or more of a power, SNR ratio, or MER values to be displayed as the signal strength in meter app 145.

Figure 4E:
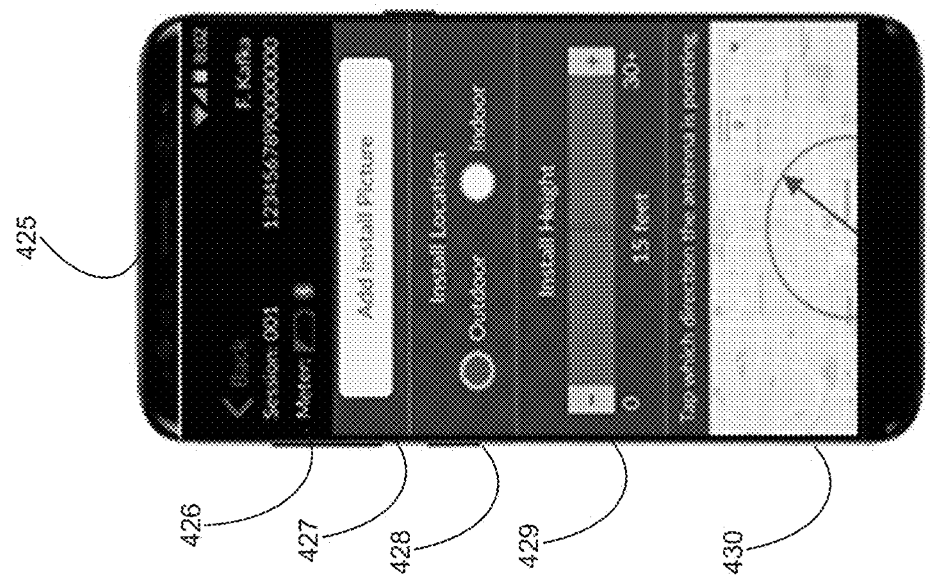
FIG. 4E is a screenshot of an installation detail GUI of the meter app, consistent with various embodiments.

FIG. 4E is a screenshot of an installation detail GUI 425 of the meter app 145, consistent with various embodiments. The installation detail GUI 425 allows the user 125 to input installation information in the meter app 145. The installation information can include one or more installation parameters such as the ones mentioned above at least with respect to FIG. 1. The installation detail GUI 425 allows the user 125 input to installation parameters such as installation picture 427, installation location or a type 428 of the OTA antenna 110, installation height 429 and an orientation 430 of the OTA antenna 110. One or more of the above parameters can be optional. The meter power indicator 426 indicates a battery level of the meter 115. In some embodiments, if the battery level drops below a specified threshold, the meter app 145 shall display a notification indicating the same.

Figure 5:
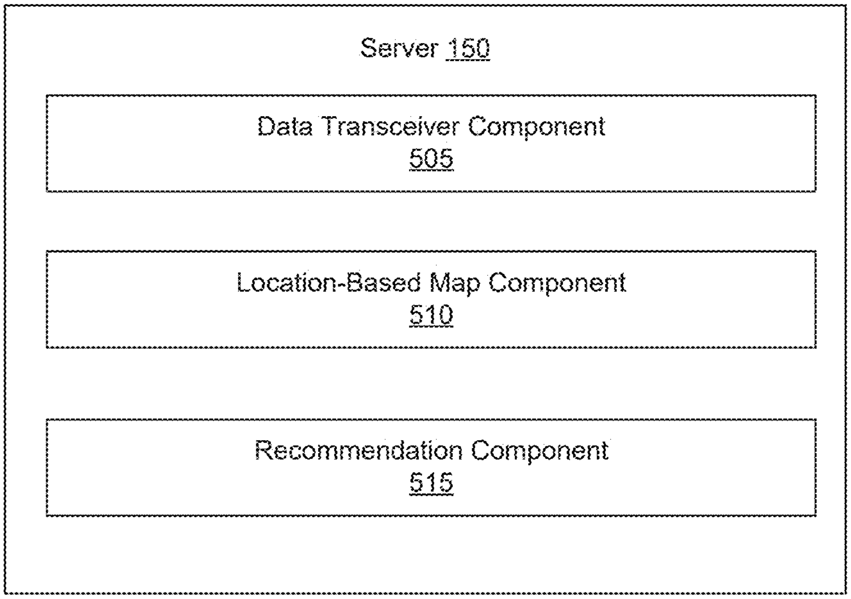
FIG. 5 is a block diagram of the server of FIG. 1, consistent with various embodiments.

FIG. 5 is a block diagram of the server of FIG. 1, consistent with various embodiments. The server 150 includes a data transceiver component 505, a location-based installation map component 510 and a recommendation component 515. The data transceiver component 505 can receive data from and transmit data to a client device, such as the client device 120. The location-based installation map component 510 can analyze installation information of various installations and generate a location-based installation map, such as the location-based installation map 215. The recommendation component 515 can predict installation information or generate a recommendation of the installation information, such as installation recommendation 310, for installing an OTA antenna at a specified location based on the installation information of OTA antennas at addresses within a specified proximity of the specified location.

Figure 6:
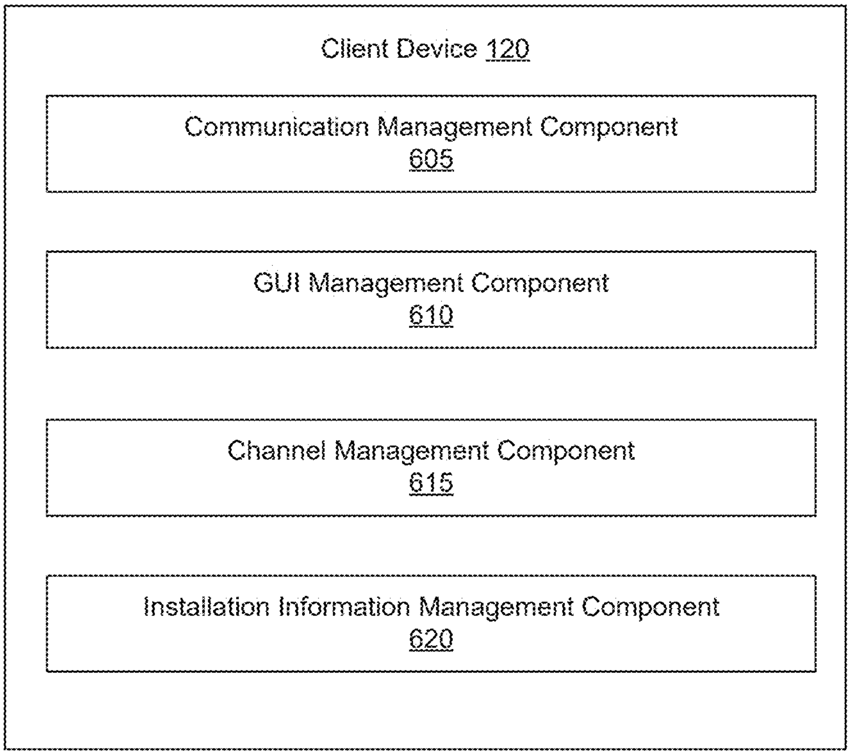
FIG. 6 is a block diagram of a client device of FIG. 1, consistent with various embodiments.

FIG. 6 is a block diagram of the client device of FIG. 1, consistent with various embodiments. The client device 120 includes a communication management component 605, a GUI management component 610, a channel management component 615, and an installation information management component 620. In some embodiments, a functionality of the meter app 145 is defined by the above components. The communication management component 605 can communicate with the meter 115 to establish a connection, e.g., wireless, between the client device 120 and the meter 115. The GUI management component 610 can generate various GUIs of the meter app 145, such as the ones in FIGS. 4A-4E. The channel management component 615 can determine the signal strength of the broadcast channels received by the OTA antenna 110, based on the signal data received from the meter. The installation information management component 620 allows the user 125 to submit installation information to the meter app 145.

Additional details with respect to the components of the server 150 and the client device 120 are described at least with reference to FIGS. 7-12 below. Note that the server 150 illustrated in FIG. 5 is not restricted to having the above described components. The server 150 can include lesser number of components, e.g., functionalities of two components can be combined into one component, or can include more number of components, e.g., components that perform other functionalities. In some embodiments, the functionalities of one or more of the above components can be split into two or more components. Furthermore, the components of the server 150 can be implemented at a single computing device or distributed across multiple computing devices. Similarly, the client device illustrated in FIG. 6 is not restricted to having the above described components. The client device 120 can include lesser number of components, e.g., functionalities of two components can be combined into one component, or can include more number of components, e.g., components that perform other functionalities. In some embodiments, the functionalities of one or more of the above components of the client device 120 can be split into two or more components.

Figure 7:
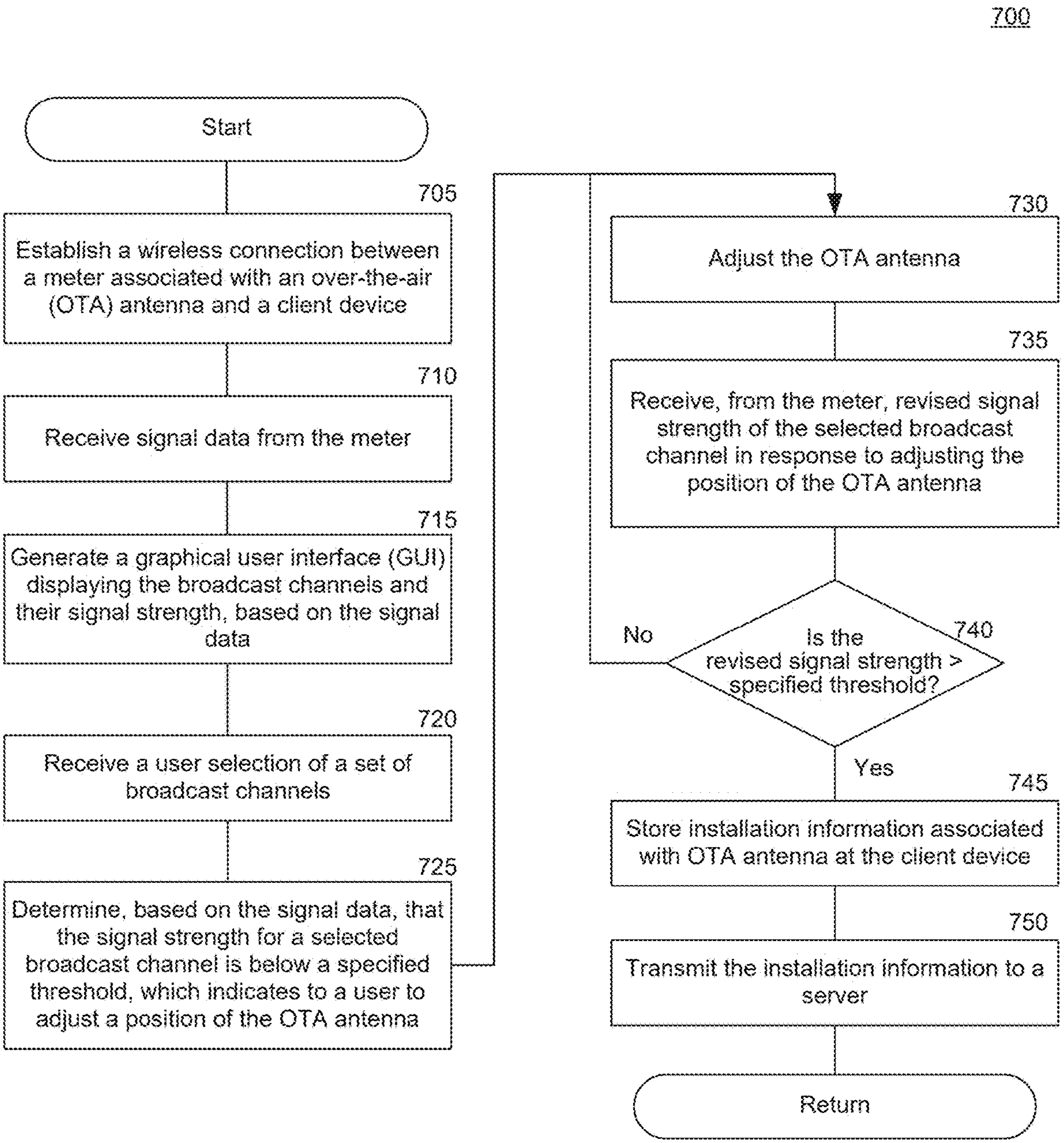
FIG. 7 is a flow diagram of a process for managing installation of an OTA antenna using the meter app, consistent with various embodiments.

FIG. 7 is a flow diagram of a process 700 for managing installation of an OTA antenna using a meter app, consistent with various embodiments. In some embodiments, the process 700 can be implemented in the environment 100. At block 705, the communication management component 605 establishes a connection, e.g., a wireless connection via Bluetooth, between the meter 115 and the client device 120.

At block 710, the channel management component 615 receives signal data from the meter 115. As described at least with reference to FIG. 1, the signal data can include one or more of a RF of a broadcast channel, signal strength of the broadcast channel, a virtual channel number of the broadcast channel, or a station name of the broadcast channel.

At block 715, the GUI management component 610 generates a GUI, such as the channel scan feature GUI 405, displaying the broadcast channels received by the OTA antenna 110 and their signal strength, based on the signal data.

At block 720, the channel management component 615 receives a user selection of a set of broadcast channels, for example, as illustrated at least with reference to FIG. 4A.

At block 725, the channel management component 615 determines that a signal for one or more of the selected broadcast channels is weak, that is, the signal strength is below a specified threshold. In some embodiments, a signal received by the OTA antenna is weak due to improper positioning of the OTA antenna. Accordingly, a weak signal can indicate to the user 125 to adjust a position of the OTA antenna 110. In some embodiments, adjusting the position of the OTA antenna 110 can be one of many indicators for improving the signal reception (others include, for example, adding a pre-amplifier, an LTE filter, etc.). In some embodiments, adjusting the position of the OTA antenna 110 can include any of changing a location of the OTA antenna in the building 105, changing an orientation of the OTA antenna 110, changing an installation height of the OTA antenna 110. Accordingly, the user 125 can reposition the OTA antenna 110 based on the signal strength displayed by the meter app 145.

At block 730, the user 125 adjusts the position of the OTA antenna 110. In some embodiments, the user 125 may refer to the mapping tool, e.g., illustrated in FIG. 4B, to adjust the orientation of the OTA antenna 110 in the direction of one or more broadcast towers that broadcast the user selected broadcast channels.

At block 735, the channel management component 615 receives a revised signal strength of the one or more broadcast channels from the meter 115 in response to adjusting the position of the OTA antenna 110.

At determination block 740, the channel management component 615 determines whether the revised signal strength is above the specified threshold.

Responsive to a determination that the revised signal strength is still weak, the user 125 can continue to adjust the position of the OTA antenna 110.

On the other hand, responsive to a determination that the revised signal is not weak any more, that is, the signal strength is above the specified threshold, at block 745, the installation information management component 620 stores the installation information associated with the OTA antenna 110, such as the installation information 140, in the meter app 145 on the client device 120. As described at least with reference to FIG. 4E, the user 125 can input the installation information in the meter app 145 using the installation detail GUI 425. Some of the installation information may be provided by the meter app 145 and some may be input by the user 125. For example, the address of the building 105 may be provided by the meter app 145, which can be retrieved from a workorder associated with the installation.

At block 750, the communication management component 605 transmits the installation information to the server 150.

Figure 8:
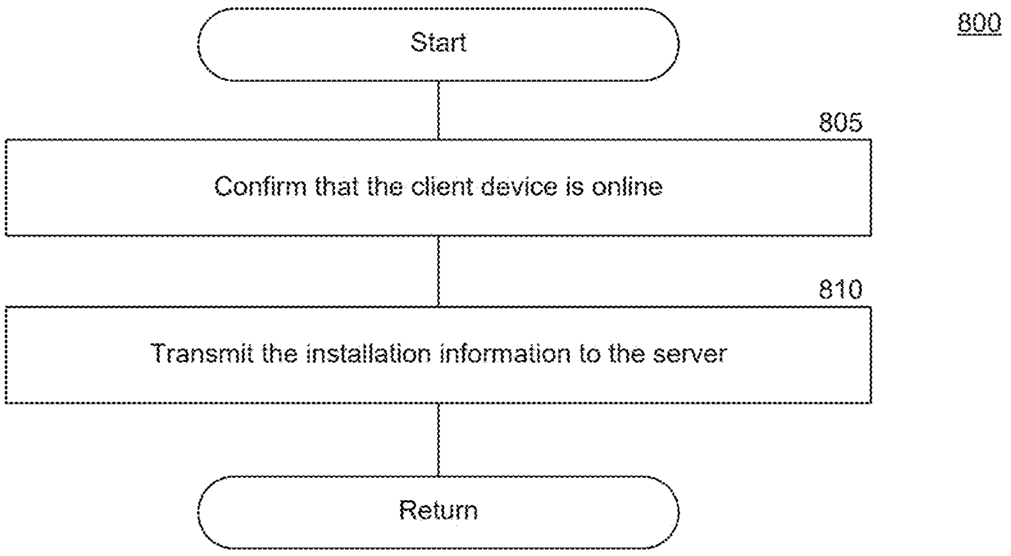
FIG. 8 is a flow diagram of a process for transmitting the installation information to the server of FIG. 1, consistent with various embodiments.

FIG. 8 is a flow diagram of a process 800 for transmitting the installation information to the server of FIG. 1, consistent with various embodiments. In some embodiments, the process 800 can be implemented in the environment 100 of FIG. 1 and as part of block 750 of FIG. 7. At block 805, the communication management component 605 confirms that the client device 120 is online. For example, the client device 120 is online if it is connected to the communication network 130 and the server 150 is accessible by the client device 120. If the client device 120 is offline, that is, the client device 120 is not connected to the communication network 130 or the server 150 is not accessible, then the client device 120 is offline. If the client device 120 is offline, the installation information stored in the meter app 145, e.g., as described at least with reference to block 740 of FIG. 7, is put in a memory queue at the client device 120 for synchronization with the server 150.

At block 810, the communication management component 605 transmits the installation information 140 to the server 150, which stores the installation information 140 at the storage system 135.

Figure 9:
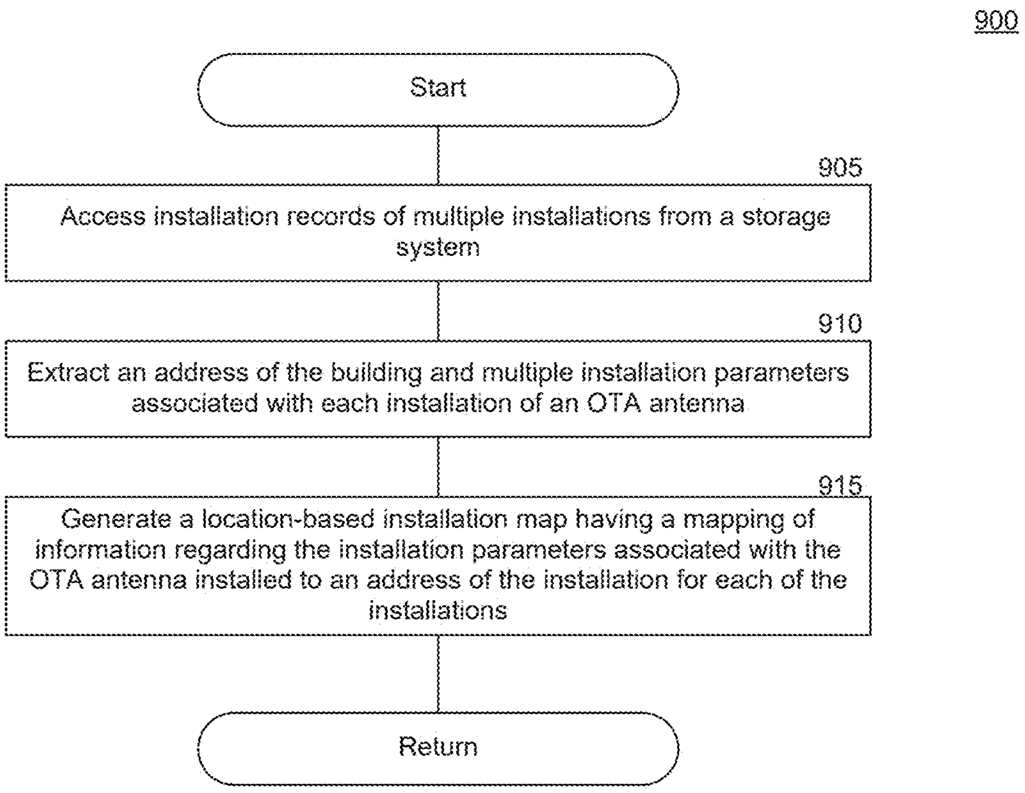
FIG. 9 is a flow diagram of a process for generating a location-based installation map, consistent with various embodiments.

FIG. 9 is a flow diagram of a process 900 for generating a location-based installation map, consistent with various embodiments. In some embodiments, the process 900 can be implemented in the environment 100 of FIG. 1. At block 905, the data transceiver component 505 accesses installation records from the storage system 135. The installation records contain installation information of multiple installations of an OTA antenna, and each installation record can have installation information, such as the installation information 140, of the corresponding installation.

At block 910, the location-based installation map component 510 extracts an address of the installation, e.g., an address of a building where the OTA antenna is installed, and one or more installation parameters from each installation record. The installation parameters can include one or more of a type of the OTA antenna 325, an installation height of the OTA antenna 325, a direction of the OTA antenna 325, an exact location of the installation of the OTA antenna 325 in the building 315, a type of the OTA adapter, a picture of the installation of the OTA antenna 325, any additional equipment to be installed with the OTA antenna 325, or a set of broadcast channels received by the OTA antenna 325 and their signal strengths.

At block 915, the location-based installation map component 510 generates a location-based installation map, such as location-based installation map 215, having a mapping of the installation parameters and the address of the installation for each of the installations. In some embodiments, each entry in the location-based installation map 215 corresponds to one installation of an OTA antenna. In some embodiments, the location-based installation map 215 can used for retrieving the installation parameters of an OTA antenna installation for a specific address, e.g., as described at least with respect to FIGS. 2A and 2B, and FIG. 10 below. In some embodiments, the location-based installation map 215 can also be used in generating a location-specific installation recommendation for installing an OTA antenna in a specific location, e.g., as described at least with reference to FIG. 3 above, and FIG. 10 below.

Figure 10:
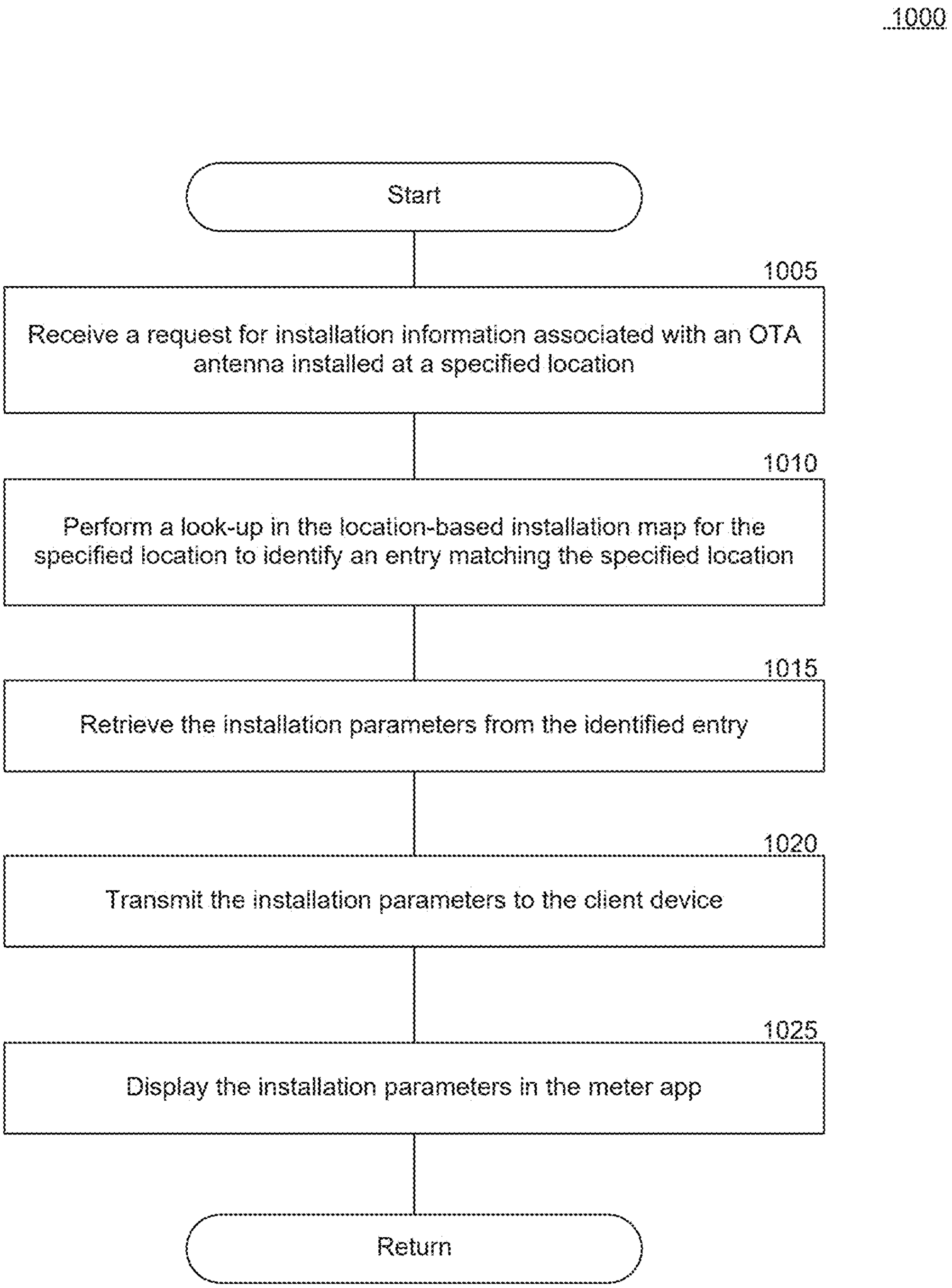
FIG. 10 is a flow diagram of a process for retrieving installation information of a specific location, consistent with various embodiments.

FIG. 10 is a flow diagram of a process 1000 for retrieving installation information of a specific location, consistent with various embodiments. In some embodiments, the process 1000 can be implemented in the environment 100 of FIG. 1. At block 1005, the data transceiver component 505 receives a request for installation information associated with an installation of an OTA antenna, such as the OTA antenna 110, at a specific location. The request can be issued by the client device 120. The request can include an address of the specific location, e.g., address of the building 105.

At block 1010, the location-based installation map component 510 performs a look-up in the location-based installation map 215 using the specified location to identify an entry matching the specific location.

At block 1015, the location-based installation map component 510 retrieves the installation parameters from the identified entry.

At block 1020, the location-based installation map component 510 transmits the installation parameters to the client device 120. The client device 120 can present the installation parameters in one of the GUIs in the meter app 145.

In some embodiments, the request for installation information can include only a portion of the address as the specific location. For example, the user 125 can provide only a street name, an intersection of two streets, a zip code, or even mark a portion on a geographical map in the meter app 145, as the location input for query. If there are multiple entries in the location-based installation map 215 that match the specific location input in the query, the server 150 returns multiple sets of installation parameters corresponding to multiple installations within a specified proximity of the query input location, e.g., as described at least with reference to FIG. 2B.

At block 1025, the location-based installation map component 510 displays the installation parameters in the meter app 145. In some embodiments, the meter app 145 can display the installation parameters for the specified location using a location-based installation information tool, such as the mapping tool 410 of FIG. 4B. The location-based installation information tool generates a geographical map in the meter app 145 and the user 125 can input the specific location by inputting an address in the geographical map, pointing a specific location in the geographical map, or marking a specific area on the geographical map (which can be a particular street, a set of streets, a set of blocks, a city etc.). The location-based installation information tool can then show the installations in the specific location on the geographical map, e.g., by displaying markers at addresses of the installations, and the user 125 can view installation parameters of a specific installation by selecting that specific installation on the geographical map. In some embodiments, the location-based installation information tool can also display the installation information as a list of installations without the geographical map.

Figure 11:
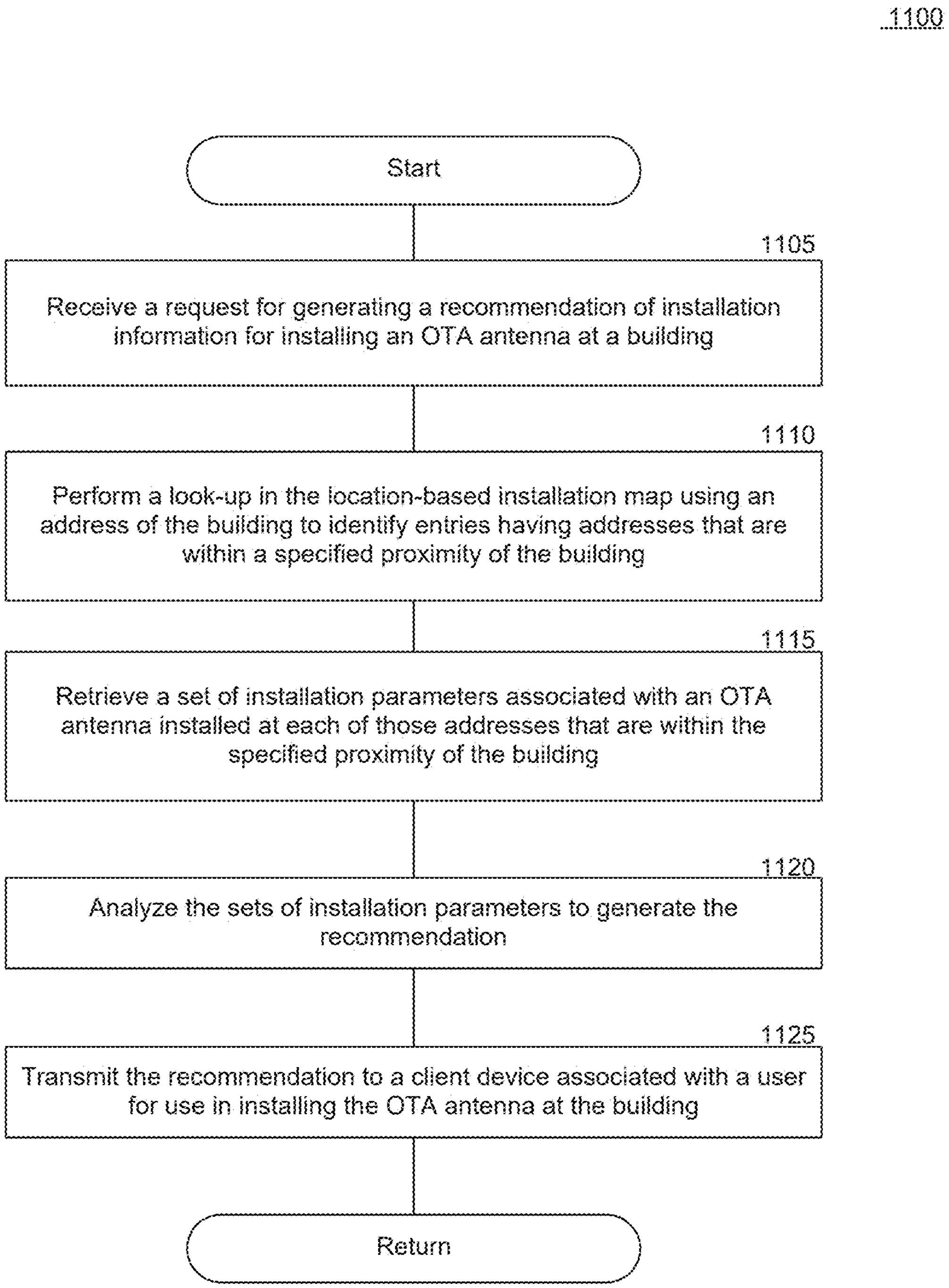
FIG. 11 is a flow diagram of a process for generating a recommendation for installation for a specific location, consistent with various embodiments.

FIG. 11 is a flow diagram of a process 1100 for generating a recommendation for installation for a specific location, consistent with various embodiments. In some embodiments, the process 1100 can be implemented in the environment 100 of FIG. 1. At block 1105, the data transceiver component 505 receives a request for generating a recommendation of installation information for installing an OTA antenna at a building. The request can be issued by the client device 120 for installing the OTA antenna 325 at the building 315 and in the specific location 320. The specific location 320 can be provided as an address of the building 315.

At block 1110, the location-based installation map component 510 performs a look-up in the location-based installation map 215 using the specific location 320 to identify entries having addresses that are within a specified proximity of the building 315.

At block 1115, the location-based installation map component 510 retrieves a set of installation parameters from each of the identified entries.

At block 1120, the location-based installation map component 510 analyzes the installation parameters of the multiple installations to generate a recommendation of the installation information, such as the location-specific installation recommendation 310, for the specific location 320. Various examples of the analysis performed are described at least with reference to FIG. 3. The location-specific installation recommendation 310 can include one or more installation parameters, such as a type of the OTA antenna 325 to be installed at the building 315, an installation height of the OTA antenna 325, a direction of the OTA antenna 325, an exact location of the installation of the OTA antenna 325 in the building 315, a type of the OTA adapter, a picture of the installation of the OTA antenna 325, any additional equipment to be installed with the OTA antenna 325, or a set of broadcast channels received by the OTA antenna 325 and their signal strengths.

At block 1125, the data transceiver component 505 transmits the location-specific installation recommendation 310 to the client device 120, which a user 125 can use for installing the OTA antenna 325 at the building 315.

Figure 12:
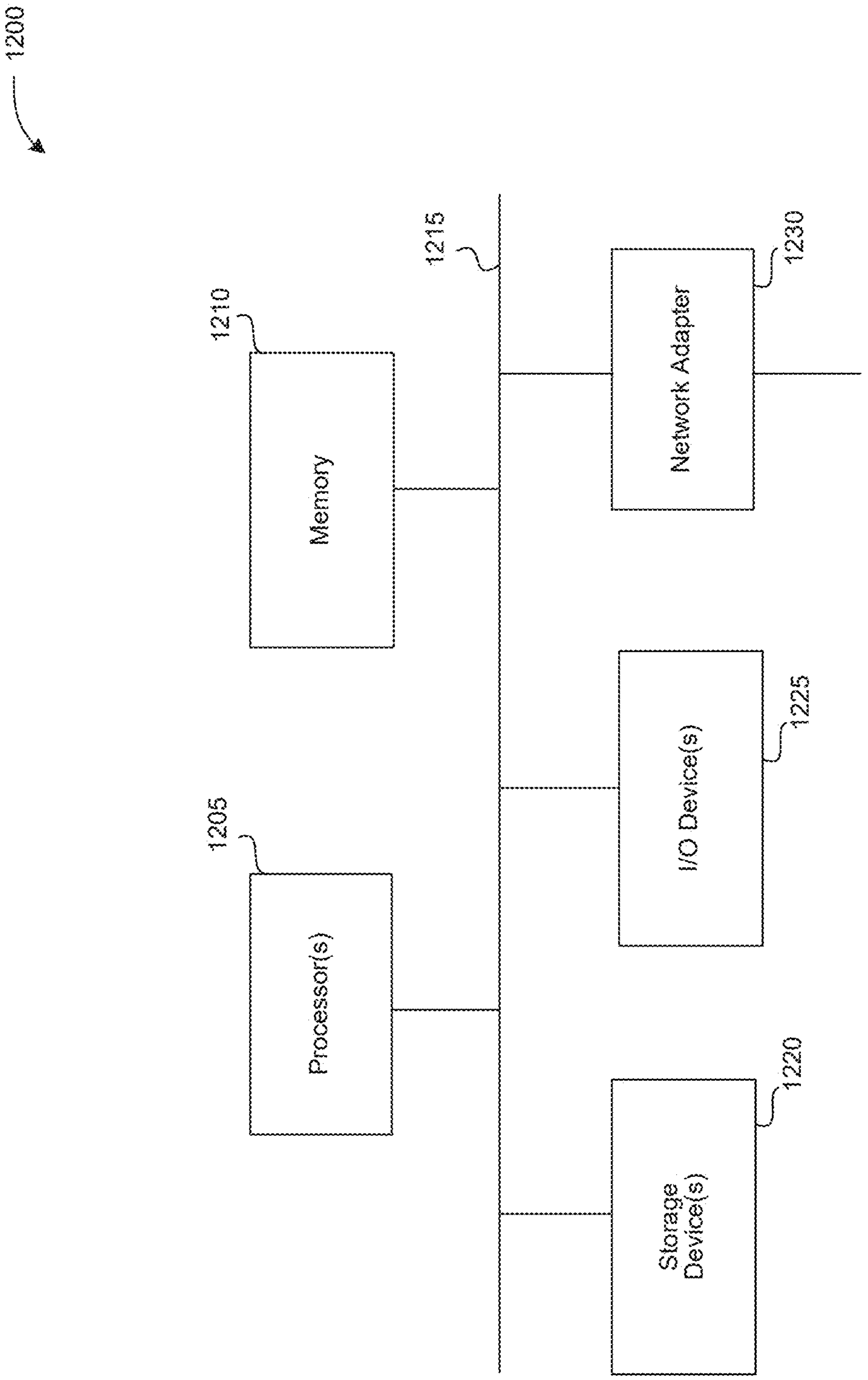
FIG. 12 is a block diagram of a processing system that can implement operations of the disclosed embodiments.

FIG. 12 is a block diagram of a computer system as may be used to implement features of the disclosed embodiments. The computer system 1200 may be used to implement any of the entities, components or services depicted in the examples of the foregoing figures (and any other components described in this specification). The computer system 1200 may include one or more central processing units ("processors") 1205, memory 1210, input/output devices 1225 (e.g., keyboard and pointing devices, display devices), storage devices 1220 (e.g., disk drives), and network adapters 1230 (e.g., network interfaces) that are connected to an interconnect 1215. The interconnect 1215 is illustrated as an abstraction that represents any one or more separate physical buses, point to point connections, or both connected by appropriate bridges, adapters, or controllers. The interconnect 1215, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Components (IEEE) standard 1394 bus, also called "Firewire."

The memory 1210 and storage devices 1220 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 1210 can be implemented as software and/or firmware to program the processor(s) 1205 to carry out actions described above. In some embodiments, such software or firmware may be initially provided to the computer system 1200 by downloading it from a remote system through the computer system 1200 (e.g., via network adapter 1230).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method, comprising:

receiving, from a client device, a request for generating a recommendation of installation information for installing an over-the-air (OTA) antenna at a service location;

retrieving a set of workorders associated with a set of locations within a specified proximity of the service location;

generating the recommendation, comprising:

analyzing installation information associated with the set of workorders; and indicating a likelihood that a broadcast channel is receivable at the service location based upon the analysis of the installation information; and providing the recommendation to the client device.

2. The method of claim 1, wherein retrieving the set of workorders associated with the set of locations within the specified proximity of the service location comprises:

performing a look-up in a location-based installation map to identify entries that have addresses that are within the specified proximity.

3. The method of claim 1, wherein the recommendation comprises at least one installation parameter of a type of the OTA antenna, an installation height of the OTA antenna, a direction of the OTA antenna, an installation location of the OTA antenna at the service location, a type of an OTA adapter, a picture of an installation of the OTA antenna, additional equipment to be installed with the OTA antenna, a set of broadcast channels receivable by the OTA antenna, or a signal strength of a broadcast channel receivable by the OTA antenna.

4. The method of claim 3, wherein the recommendation comprises the signal strength of a broadcast channel receivable by the OTA antenna as a range of values.

5. The method of claim 1, wherein the installation information associated with the set of workorders is analyzed based on an artificial intelligence (AI) based analysis technique, a machine learning (ML) analysis technique, a rule-based analysis technique, or a statistical analysis technique.

6. The method of claim 1, wherein analyzing the installation information associated with the set of workorders comprises determining from the analysis of the installation information a number of buildings that receive a broadcast channel.

7. The method of claim 1, wherein generating the recommendation comprises:

determining from the analysis of the installation information that a broadcast channel is not available for reception at one or more buildings; and indicating in the recommendation a likelihood of unavailability of the broadcast channel for reception at the service location.

8. The method of claim 1, wherein generating the recommendation comprises:

determining from the analysis of the installation information that a broadcast channel is available for reception at one or more buildings if a pre-amplifier is installed; and indicating in the recommendation that a specified broadcast channel is likely available for reception at the service location at a specified signal strength if a pre-amplifier is installed with the OTA antenna.

9. The method of claim 1, wherein generating the recommendation comprises:

determining from the analysis of the installation information that a location of one or more buildings is prone to interference by a wireless broadband signal; and indicating in the recommendation that a broadcast channel is available for reception at the service location at a specified signal strength if a wireless broadband signal filter is installed with the OTA antenna.

10. The method of claim 1, wherein generating the recommendation comprises:

determining from the analysis of the installation information that a location of one or more buildings is prone to multipath inflection or interference; and indicating in the recommendation an installation parameter to prevent the multipath inflection or interference.

11. The method of claim 10, wherein the installation parameter comprises at least one of:

(a) avoiding a set of locations for the OTA antenna installation at the service location, or (b) installing the OTA antenna in a particular location of the service location.

12. The method of claim 1, wherein generating the recommendation comprises:

determining from the analysis of the installation information that (a) to receive a broadcast channel at one or more buildings, (b) for certain types of buildings, or (c) buildings in a specified location, a specified type of the OTA antenna is needed; and indicating in the recommendation that the specified type of the OTA antenna is needed for receiving the broadcast channel at the service location.

13. The method of claim 1, wherein the request comprises the service location in a form of a complete address or a portion of the complete address.

14. The method of claim 1, further comprising:

receiving, for storage, installation information for installing, based on the recommendation, the OTA antenna at the service location.

15. The method of claim 14, wherein the installation information associated with the service location comprises one or more of a type of the OTA antenna, a type of an OTA adapter, an installation location of the OTA antenna, an installation height of the OTA antenna, an orientation of the OTA antenna, or a picture of installation of the OTA antenna.

16. One or more non-transitory computer-readable storage media storing computer-readable instructions that, when executed by at least one processor, cause operations comprising:

receiving, from a client device, a request for generating a recommendation of installation information for installing an over-the-air (OTA) antenna at a service location;

retrieving a set of workorders associated with a set of locations within a specified proximity of the service location;

generating the recommendation, comprising:

analyzing installation information associated with the set of workorders; and indicating a likelihood that a broadcast channel is receivable at the service location based upon the analysis of the installation information; and providing the recommendation to the client device.

17. A system, comprising:

one or more processors; and one or more non-transitory, computer-readable media comprising instructions that, when executed by the one or more processors, cause operations comprising:

receiving, from a client device, a request for generating a recommendation of installation information for installing an over-the-air (OTA) antenna at a service location;

retrieving a set of workorders associated with a set of locations within a specified proximity of the service location;

generating the recommendation, comprising:

analyzing installation information associated with the set of workorders; and indicating a likelihood that a broadcast channel is receivable at the service location based upon the analysis of the installation information; and providing the recommendation to the client device.

18. The system of claim 17, wherein retrieving the set of workorders associated with the set of locations within the specified proximity of the service location comprises:

performing a look-up in a location-based installation map to identify entries that have addresses that are within the specified proximity.

19. The system of claim 17, wherein the recommendation comprises at least one installation parameter of a type of the OTA antenna, an installation height of the OTA antenna, a direction of the OTA antenna, an installation location of the OTA antenna at the service location, a type of an OTA adapter, a picture of an installation of the OTA antenna, additional equipment to be installed with the OTA antenna, a set of broadcast channels receivable by the OTA antenna, or a signal strength of a broadcast channel receivable by the OTA antenna.

20. The system of claim 17, wherein the installation information associated with the set of workorders is analyzed based on an artificial intelligence (AI) based analysis technique, a machine learning (ML) analysis technique, a rule-based analysis technique, or a statistical analysis technique.

* * * * *